US008689535B2

(12) United States Patent
Jackson

(10) Patent No.: US 8,689,535 B2
(45) Date of Patent: Apr. 8, 2014

(54) SCREW SHAFT TURBINE COMPRESSOR AND SYSTEM

(76) Inventor: John R. Jackson, Littleton, CO (US)

( * ) Notice: Subject to any disclaimer, the term of this patent is extended or adjusted under 35 U.S.C. 154(b) by 883 days.

(21) Appl. No.: 12/876,836

(22) Filed: Sep. 7, 2010

(65) Prior Publication Data
US 2010/0329839 A1 Dec. 30, 2010

Related U.S. Application Data

(63) Continuation-in-part of application No. 11/774,418, filed on Jul. 6, 2007, now Pat. No. 7,788,896.

(51) Int. Cl.
F02C 3/02 (2006.01)
F02C 3/04 (2006.01)
B63H 1/16 (2006.01)

(52) U.S. Cl.
USPC ............ 60/39.45; 60/39.43; 416/177

(58) Field of Classification Search
USPC ............ 60/39.43, 39.45; 415/72, 74, 75; 416/177
See application file for complete search history.

(56) References Cited

U.S. PATENT DOCUMENTS

| 2,645,412 | A | | 7/1953 | Sens | |
| 2,808,813 | A | * | 10/1957 | Teodor et al. | 418/94 |
| 3,310,043 | A | * | 3/1967 | Gamage | 123/204 |
| 3,386,245 | A | * | 6/1968 | Gamage | 376/391 |
| 3,609,058 | A | * | 9/1971 | Tarsoly | 415/104 |
| 3,932,988 | A | | 1/1976 | Beaufrere | |
| 7,788,896 | B2 | * | 9/2010 | Jackson | 60/39.45 |

OTHER PUBLICATIONS

U.S. Appl. No. 11/774,418, filed Jan. 8, 2009, Jackson.
Office Action Re U.S. Appl. No. 11/774,418, filed Dec. 4, 2009.

* cited by examiner

Primary Examiner — Ehud Gartenberg
Assistant Examiner — Karthik Subramanian
(74) Attorney, Agent, or Firm — Leyendecker & Lemire, LLC

(57) ABSTRACT

Disclosed herein are screw shaft turbine compressors having (i) a compressor section, (ii) a turbine section, (iii) a combustion section coupling to the compressor section and the turbine section, and (iv) a grooved shaft. The grooved shaft can include one or more grooves for providing fuel from the compressor section to the combustion section and for allowing exhaust to leave the combustion section and exit the turbine section. A method for generating different speed to torque ratios on the shaft and a system for generating torque on the shaft are further disclosed.

20 Claims, 6 Drawing Sheets

SCREW SHAFT TURBINE COMPRESSOR AND SYSTEM

CROSS-REFERENCE TO RELATED APPLICATIONS

This application is a continuation-in-part of and claims priority to U.S. Nonprovisional patent application Ser. No. 11/774,418 filed Jul. 6, 2007, the full disclosure of which is incorporated herein by reference. The aforementioned non-provisional patent application has the title "Screw Shaft Turbine Compressor," and has the same named inventor as the present application.

FIELD OF THE INVENTION

This invention generally relates to compressor turbines.

BACKGROUND OF THE INVENTION

Compressor turbines are combustion rotary engines. Although combustion turbine engines come in various designs, each engine is defined by a compressor section adapted to increase the pressure on the air or air-fuel mixture, a combustion chamber which ignites the compressed mixture, and a coupled turbine portion. The energy released from the combustion chamber spins the turbine portion, which, in turn, powers and rotates the compressor section.

Turbine-compressor combustion engines were first patented in England in the late $18^{th}$ century. However, it wasn't until the $20^{th}$ century that turbines were developed which could be used to operate useful machinery. Particularly, axial-flow turbine compressors, where compressed fluid or gas flows generally parallel an axis of rotation, began to be developed and used in the aircraft industry during the 1940's. By the 1950's every major aircraft engine developer had moved to an axial-flow engine type.

Modern-day compressor turbines incorporate the use of blades to rotate and compress the fluid or gas. A typical axial compressor has a shaft which looks like a fan with blades, likely contoured, which are followed by a set of stationary blades, also known as stators. The blades may help increase efficiency of compressor designs. Additionally, axial compressors have a general conical shape, widest at the inlet, to compress the fluid or gas towards the combustion chamber.

The problem with many current turbine-compressor engines is that they are unreliable. Complex blade orientation design create increased breakdown opportunities, especially when the engines run at high output rates. Many of these maintenance problems cause safety hazards, either during repair or upon failure. Additionally, the fuel efficiency of many of these turbine engines, even with the use of fans, is uneconomical for many applications.

DETAILED DESCRIPTION

Figure 1:
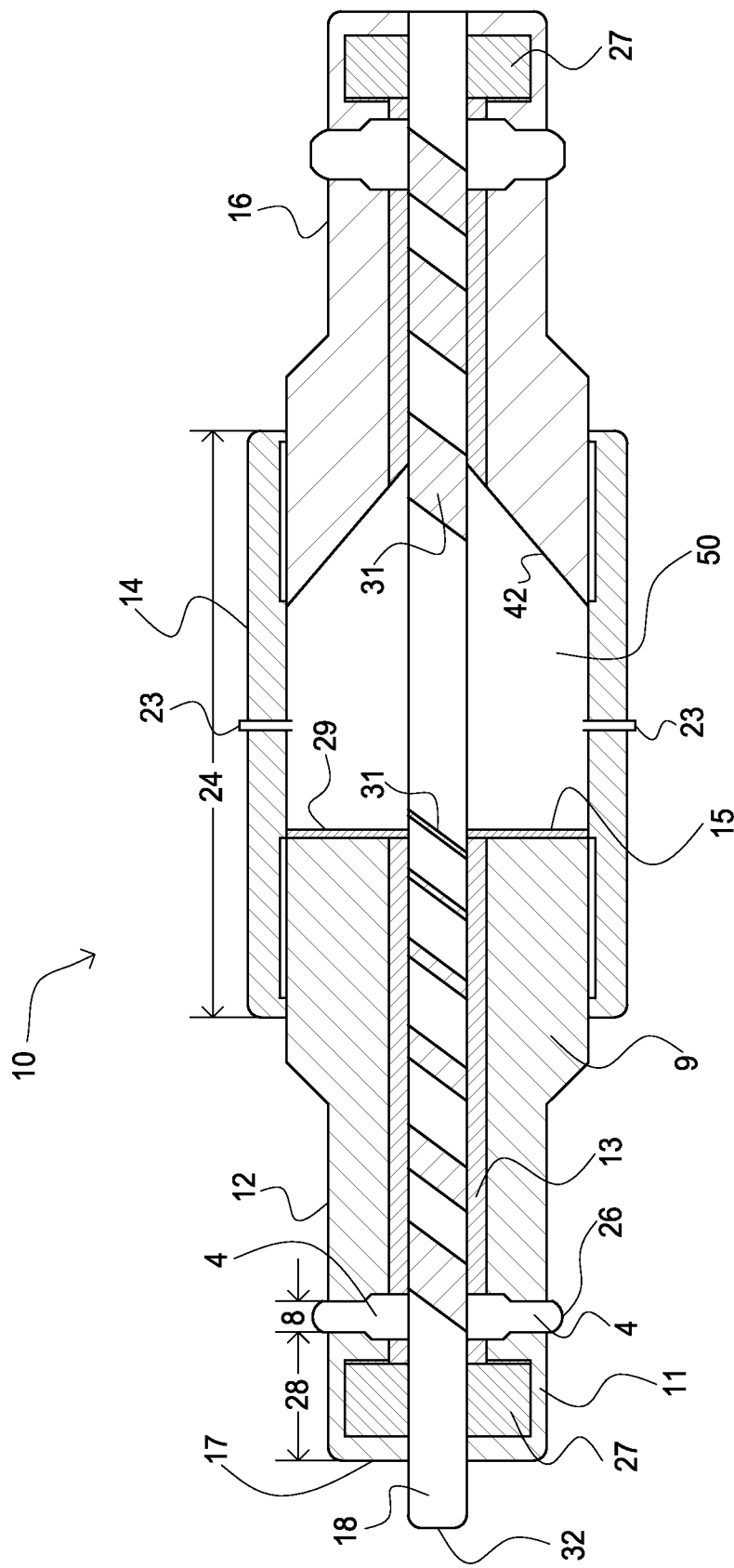
FIG. 1 is a side cut-away view of a screw shaft turbine compressor according to a first embodiment.

Embodiment of a screw shaft turbine compressor offer potentially greater reliability than prior art turbine compressors as the embodiments do not incorporate the use of blades to compress and direct fluid flow. Instead, embodiments rely on a grooved shaft to direct and compress fluid flow. In addition to the grooved shaft, embodiments are typically comprised of three sections: a compressor section, a combustion section, and a turbine section. However, a version is also contemplated that includes blades, also known as fins.

The combustion section can be a hollow cylinder having at least one ignition device. The combustion section material typically has high yield strength such as, but not limited to, hardened steel or a steel alloy. One end of the combustion section is adapted to couple to the compressor section and one end is adapted to couple to the turbine section. Embodiments can employ threaded sections to enable coupling, however, other coupling methods may be employed. The ignition device can be a spark plug and various composite materials may also be used as applicable.

Coupled to a first end of the combustion section of several embodiments is the compressor section. In some embodiments where the inner surface of a cylindrical combustion cylinder is threaded, the compressor section is also cylindrically-shaped and has threads on the outer surface of a portion of a distal end of the section. The compressor section outer surface threads are substantially adapted to mate with the combustion section inner surface threads. Also in an embodiment, the diameter of the compressor section distal end can be larger than the diameter of a compressor section proximal end.

The compressor section also includes a bore whose longitudinal axis is typically substantially parallel with the longitudinal axis of the compressor section. The center of the bore can be substantially aligned with the center of the outer surface of the distal end and the outer surface of the proximal end of the compressor section. The outer surface of each end is typically generally parallel to each other and perpendicular the compressor section's longitudinal axis. Encircling the bore can be a busing comprised of ceramic or hardened steel. Included in the compressor section are one or more input or inlet ports. The one or more inlet ports are adapted to receive a substance such as, but not limited to, fuel, air, or a fuel-air mixture, and introduce the substance to the bore.

In embodiments, the turbine section can be generally a mirror-image of the compressor section. For example, the proximal end of the turbine section can be coupled to the combustion section through threads substantially similar to the compressor section's distal end threads. Additionally, the turbine section proximal end can have a diameter greater than the distal end. The turbine section bore can also substantially similar to the compressor section bore.

A difference between the compressor section and the turbine section is that one turbine section proximal end outer surface is generally not parallel to the turbine section distal end outer surface—nor is the proximal end outer surface generally perpendicular to the longitudinal axis of a turbine section bore. Although the distal end outer surface is generally parallel to the longitudinal axis of the turbine section, the proximal end outer surface is angled towards the distal end, ending in the bore generally located in the center of the surface. Therefore, the proximal end of the turbine section is generally conically-shaped or concave-shaped with the bore located at the cone apex. Another difference between the turbine section and the compressor section is that the turbine section has one or more exhaust ports instead of one or more inlet ports. The exhaust ports can be adapted to allow exhaust to be released from the bore.

The shaft is typically placed in through the compressor section, coupled combustion section and turbine section bores. In addition to the bushing-lined bores, the shaft can be supported in with bearings. At least one bearing may be located within the compressor section and at least one bearing may be located in the turbine section. The shaft typically has at least one spiraled or helically-shaped groove on its surface. A first groove in a first embodiment spirals from a location proximal the compressor section intake port and ends at a location proximal the edge of the compressor section's distal end. However, the similar first groove in a second embodiment can be a generally straight groove from a location proximal the compressor section inlet port and ends at a location proximal the edge of the compressor section's distal end. In some embodiments, the groove width is adapted to decrease as the distance towards the compressor section distal end decreases. A second groove typically comprises a spiraled or helical groove and generally extends from the combustion chamber to the one or more exhaust port in the turbine section. An exemplary embodiment of a system for generating torque on a shaft using embodiments of the screw shaft turbine compressor is also described herein.

Terminology:

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The term "removable," "removably coupled," "readily removable," "threadably coupled," and similar terms, as used in this specification and appended claims, refer to structures that can be uncoupled from an adjoining structure with relative ease (i.e., non-destructively and without complicated or time consuming process), and can also be readily reattached or coupled to the previously adjoining structure.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "composite", "composites" or any version thereof refers to a solid material which is composed of two or more substances having different physical characteristics and in which each substance retains its identity while contributing desirable properties to the whole.

Figure 2:
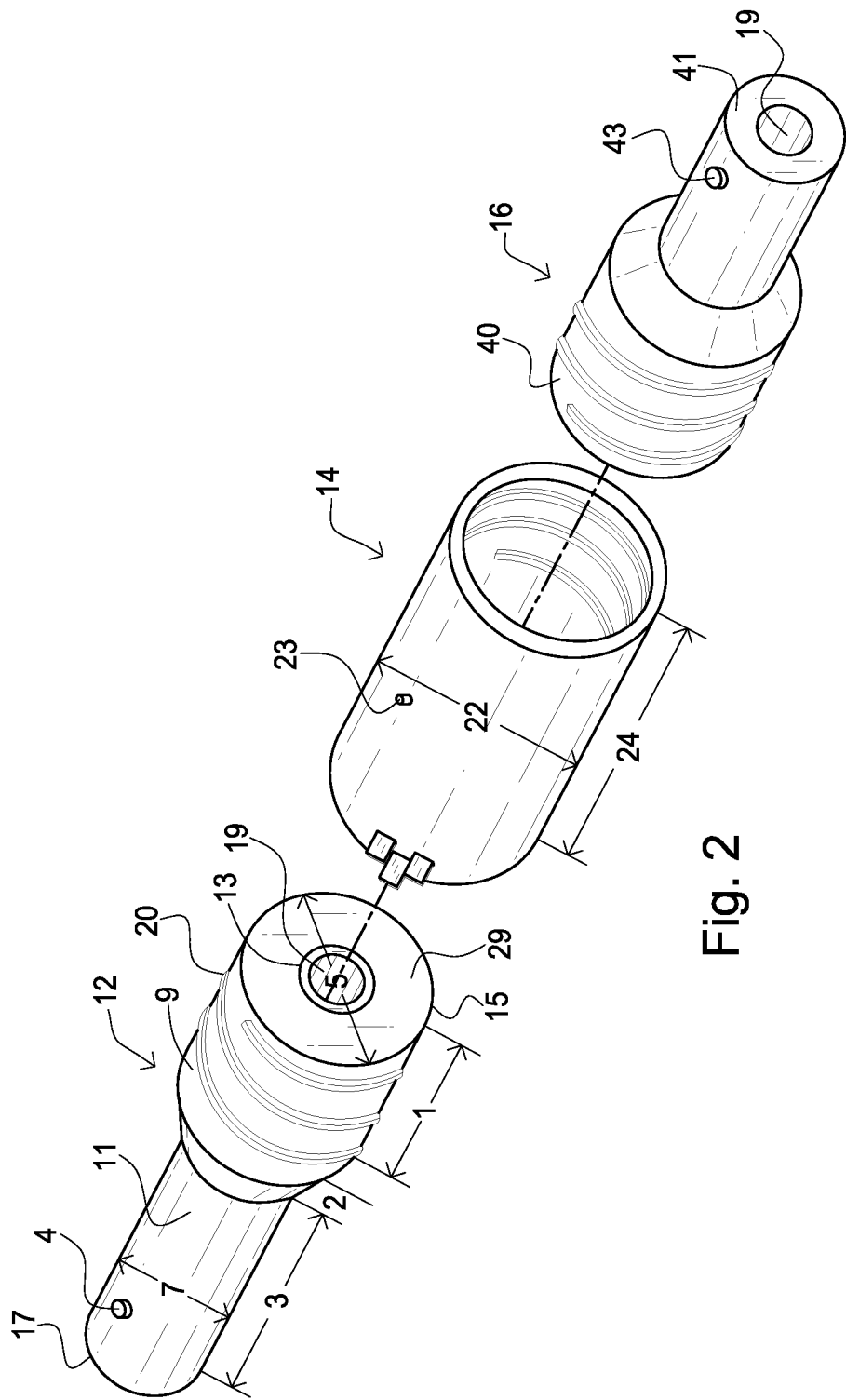
FIG. 2 is an isometric view of a compressor section, a combustion section and a turbine section of a screw shaft turbine compressor without a screw shaft according to a first embodiment.
Figure 3:
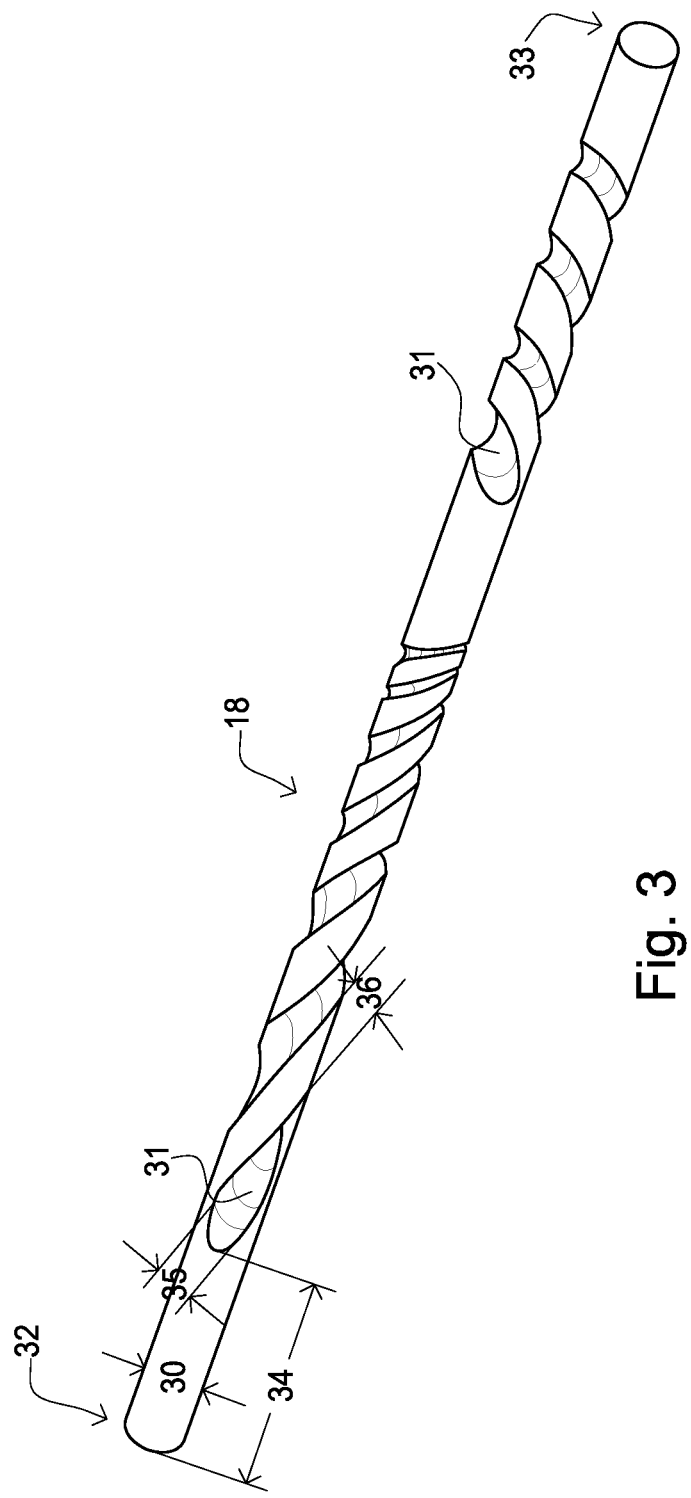
FIG. 3 is an isometric view of a screw shaft according to one embodiment.

First Embodiment of a Screw Shaft Turbine Compressor:

Referring to FIGS. 1, 2, and 3, an embodiment of a screw shaft turbine compressor is shown. In one embodiment, the screw shaft turbine compressor 10 is comprised of 3 sections—a compressor section 12, a combustion section 14, and a turbine section 16. The screw shaft turbine compressor also includes a shaft 18. As best shown in FIG. 2, three sections are generally cylindrically-shaped with generally circular cross-sections. Other embodiments may have only two sections or may have non circular cross-sections as applicable.

In one embodiment, the sections are adapted to couple to each other. For example, as best shown in FIG. 2, a portion of the compressor section 12 may be comprised of a thread 20 which is adapted to mate with a threaded portion of the combustion section 14. Similarly, the combustion section may be adapted to couple with the turbine section through a set of threads adapted to mate with each other. It may be the ends of the combustion section cylinder that have the threads. Upon coupling the turbine section and compressor section to the combustion section, a combustion chamber 50 is created, as best shown in FIG. 1. One side of the combustion chamber may be comprised of the compressor section, one side of the combustion chamber may be comprised of the turbine section, and at least one combustion chamber wall may be comprised of the combustion section.

Another embodiment may be unitary in nature, such as, an embodiment having three integrated sections. Yet one embodiment may also have three sections that are coupled through means other than mating threads. Additionally, one embodiment may be comprised of only two sections or more than three sections. The two sections may be integrated or may be adapted to couple to each other. Upon coupling, the two sections may comprise a combustion chamber 50.

In a three section embodiment having a combustion section, the combustion section may have an outside diameter 22 of 8 inches and a length 24 of 6 inches. Embodiments are contemplated that have larger and smaller combustion sections, depending on the application. The combustion section is typically comprised of a material which is adapted to withstand the heat and pressure that occurs during turbine operation. For example, one combustion section may be comprised of steel or a steel alloy. Other materials, such as, but not limited to, composite materials may be used as well in an embodiment.

Included in the combustion section 14 in one embodiment is at least one ignition device 23. One embodiment is comprised of two ignition devices, as best shown in FIG. 1. The ignition device may be a device, such as, but not limited to, a spark plug, which is adapted to create an arc of electrical current between two electrodes. The arc of current creates a spark which ignites a fuel mixture in the combustion section.

In an embodiment having a combustion section 14 coupled to the compressor section 12 and the turbine section 16, fuel may enter the combustion chamber 50 through a bore 19 located in the compressor section, as best shown in FIGS. 2 and 1. The bore may extend from a compressor section proximal end 17 to a compressor section distal end 15. The longitudinal axis of the bore is generally perpendicular to the compressor section proximal and distal ends in one embodiment. Additionally, the center of the bore is generally aligned with the center of the proximal and distal ends of the compressor section in one embodiment.

Surrounding the bore 19 in the compressor section 12 in one embodiment is a bushing 13. An embodiment's bushing may not completely encircle the bore, but in one embodiment substantially surrounds the bore. The bushing may be comprised of ceramic or hardened steel. Other bushing materials are contemplated. The bushing is generally adapted to strengthen the bore. The compressor section may be comprised of a steel alloy or any other material which may be similar to the material the combustion section is comprised of.

In one embodiment, the compressor section 12 is comprised of two portions. An embodiment's first portion 11 has a first portion diameter 7 which is smaller than the diameter 5 of the second portion 9. In one compression section embodiment, the diameter increases from the first portion to the second portion in a generally linear manner and along an increasing diameter portion of the compressor section.

The length 3 of a first portion 11 may be about 4 inches and one first portion diameter may be about 4 inches. The length of one second portion 9 may be about 4 inches and a diameter of a second portion may be about 6 inches. In an embodiment, one length 2 of the increased diameter portion is less than the length or the diameter of the first portion or the second portion. One version may have an increased diameter portion length of 1 inch.

Included in one first portion 11 of a version is at least one inlet port 4. A version may also include two inlet ports, as best shown in FIG. 1, with one inlet port bore entrance 6 opposing the other inlet port bore entrance. The inlet ports are adapted to allow air, fuel, an air-fuel mixture, or any other substance to pass through the port and into the bore 19. The longitudinal axis of the inlet ports of one embodiment are generally perpendicularly aligned with the longitudinal axis of the compressor section first portion and the bore. One inlet port may have a generally circular cross-sectional geometry, with a diameter 8 of the inlet port 4 varying over the inlet port length. The inlet port diameter in one embodiment may be larger at a bore entrance 6 than at an outer surface inlet port opening 26. One inlet port may include a device such as, but not limited to, a nozzle, adapted to release fluid into the bore. The inlet port distance 28 from the compressor section's proximal end 17 in one embodiment may be equal to about 2 inches.

Included in the compressor section 12 in one embodiment may be a support mechanism such as, but not limited to, a rotatably adapted support mechanism. One rotatably adapted support mechanism may be a bearing 27. The bearing is adapted to permit radial motion between the shaft 18 and the compressor section and may provide support to the shaft. One embodiment may use ball bearings as the bearing. Other bearings may also be used such, but not limited to, jewel bearings, fluid bearings, magnetic bearings, and flexure bearings. Fluid bearings may be gas bearings, hydrostatic bearings, hydrodynamic bearings, foil bearings, or journal bearings. Other radially adapted support mechanisms may be used.

The shaft 18 in one version is a cylindrical rod. The rod may have a generally circular cross-section. One shaft comprises a diameter 30 adapted to fit in the bore 19 in the compressor and turbine sections, as best shown in FIG. 1. In one embodiment, the shaft diameter may be about 2 inches. One shaft version has an outer surface upon which there is at least one groove 31, as best shown in FIG. 3. In one embodiment, the groove may be a spiraled or helical groove. The groove may spiral from a shaft proximal end 32 towards a shaft distal end 33. In one embodiment, the groove begins at a distance 34 from the proximal end, with one version's start distance being about 2 inches. In one embodiment, the beginning of the groove opposes the inlet port bore entrance 6, as best shown in FIG. 1. One version may have more than one groove.

To compress the mixture in one embodiment, the width 35 of the groove 31 in one embodiment decreases as the distance from the proximal end 32 of the shaft 18 increases. An ungrooved distance 36 between the grooves also decreases in one embodiment as the distance from the proximal end of the shaft increases, as best shown in FIGS. 1 and 3. The grooves may also be referred to as spirals. Other groove designs adapted to compress the mixture are also contemplated. For instance, the depth of the groove may vary along its length.

In one embodiment, the groove width 35 is less than the shaft diameter 30. A version's groove width at the groove start may be 1 inch. The proximal end 32 of the shaft in one embodiment may extend further than the proximal end 17 of the compressor section, upon the shaft being correctly placed in the compressor section, as best shown in FIG. 1. Therefore, the inlet port distance 28 in a version is less than the groove start distance 34. Upon coupling the combustion section 14 to the compressor section 12, the shaft 18 in one embodiment is adapted to extend at least from the proximal end 17 of the compressor section into the combustion chamber 50. The groove 31 in one embodiment ends after entering the combustion chamber.

However, in one embodiment, when the turbine section 16 is coupled to the combustion section 14, the shaft 18 may be a single shaft which extends through the combustion chamber 50 and into the bore 19 located in the turbine section. The groove on the shaft may begin anew at the point proximal the shaft entering a turbine section bore. The width of the groove in the turbine section may stay substantially stable throughout the turbine section, and the distance between the groove in the turbine section may stay substantially stable as well. However, the width and distance between the groves may vary as well.

One embodiment's turbine section 10 is substantially similar to the compressor section 12. However, the proximal end 40 of a turbine section may be coupled to the combustion section, whereas a distal end 15 of the compressor section may be coupled to the combustion section. Therefore, the turbine section may generally a minor image of the compressor section, except for a conical surface, including bearings.

One difference between the compressor section and the turbine section is that the distal end surface 29 of the compressor section is generally perpendicular from the longitudinal axis of the bore 19, whereas the proximal end surface 42 of the turbine section is generally a conical surface angled towards the distal end 41 and the bore. Another difference is that the port 43 on the turbine section is not an inlet port, but is an exhaust port.

Operation of one embodiment allows for an air-fuel mixture to enter into the bore 19 of the compressor section 12 through at least one inlet port 4. As the fluid enters the bore, it is captured into the groove 31 on the shaft 19. As the shaft spins, the fluid travels towards the combustion chamber 50, being compressed in the process. Upon entering the combustion chamber, the fluid may be vaporized and ignited, with the combustion energy being directed on the shaft entering the turbine section, spinning the shaft, with the exhaust gas exiting out the exhaust port 43.

Figure 4:
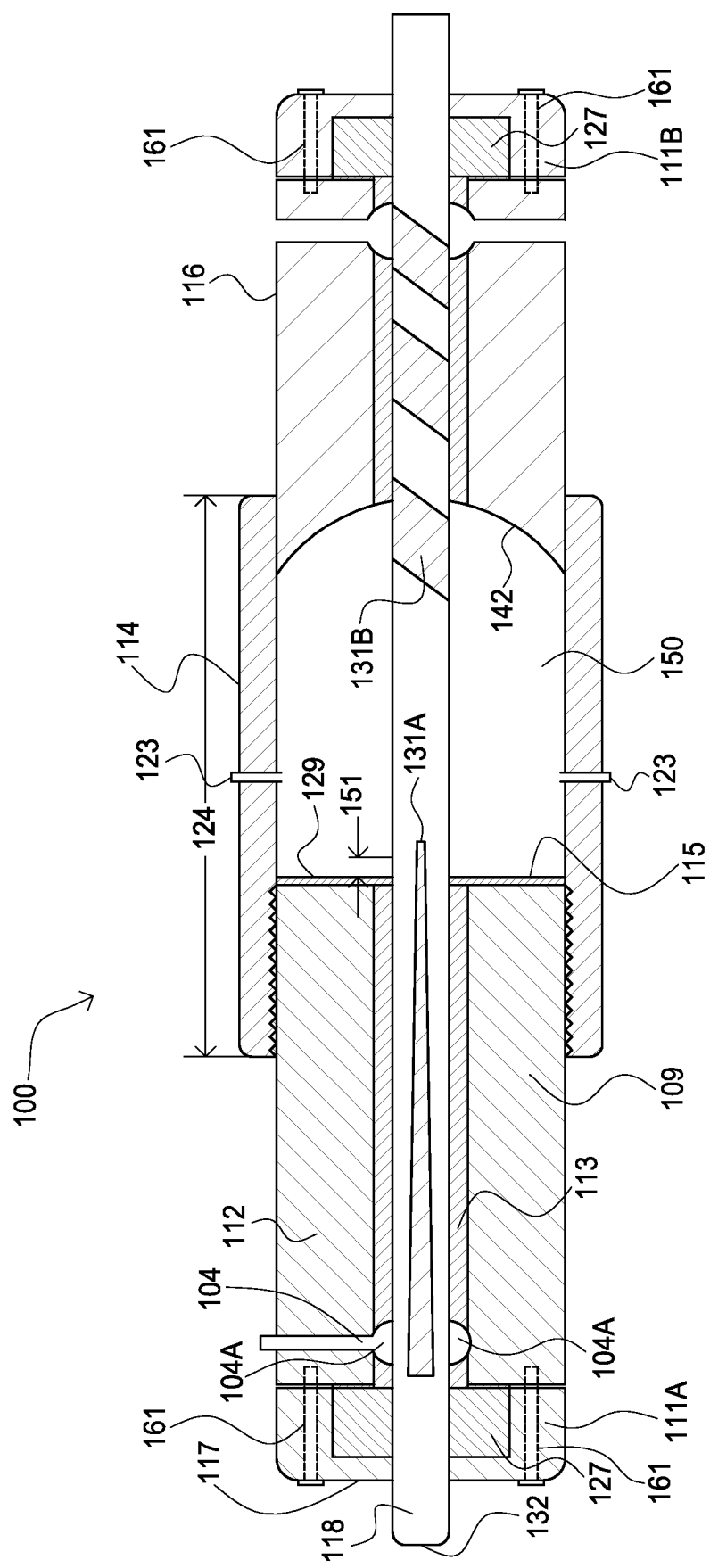
FIG. 4 is a side cut-away view of a screw shaft turbine compressor according to a second embodiment.
Figure 5:
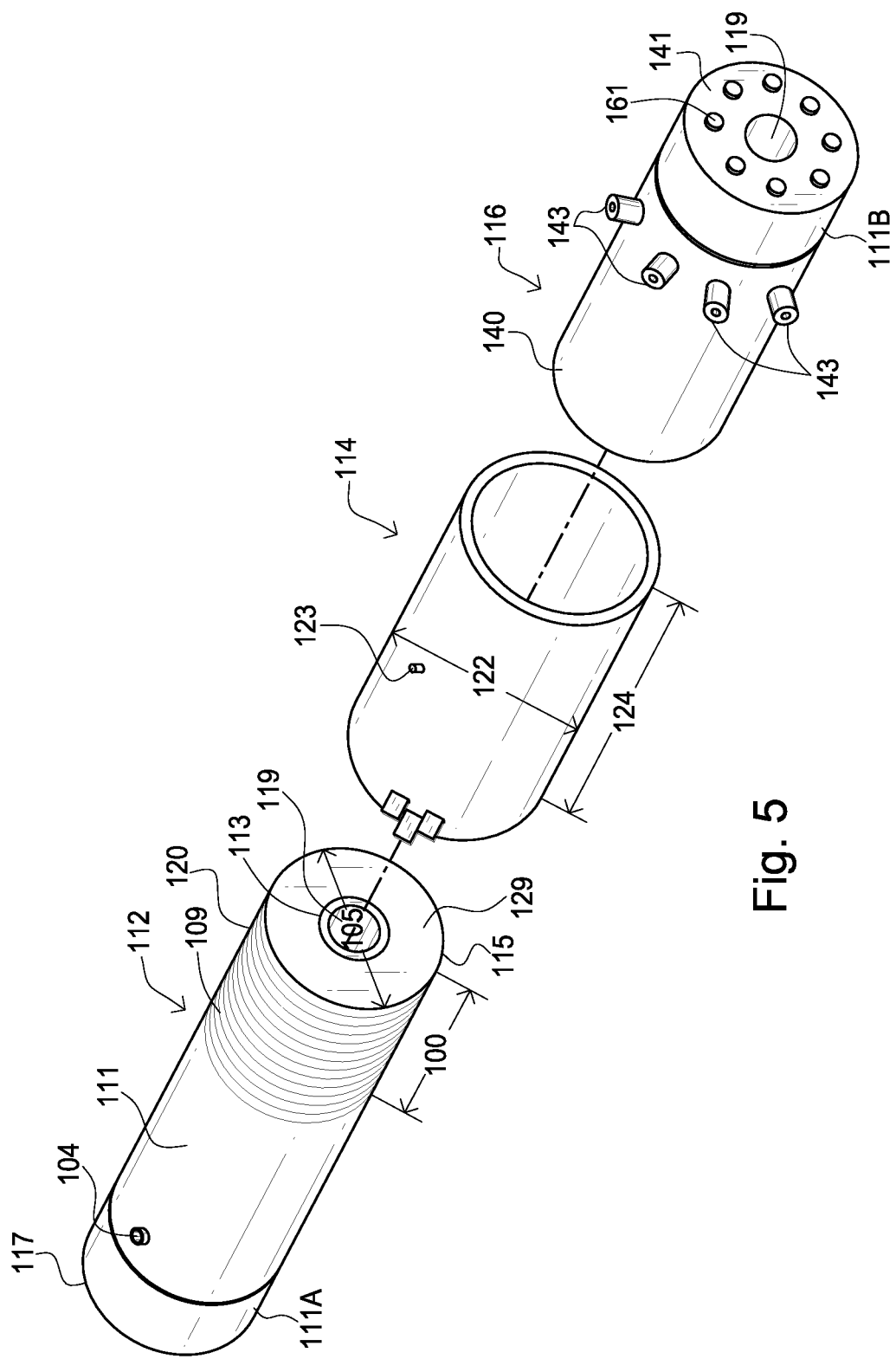
FIG. 5 is an isometric view of a compressor section, a combustion section and a turbine section of a screw shaft turbine compressor without a screw shaft according to a second embodiment.

Second Embodiment of a Screw Shaft Turbine Compressor:

Now referring to FIGS. 4 & 5, a second embodiment of a screw shaft turbine compressor is shown. In one embodiment, the screw shaft turbine compressor 100 comprises three main sections—a compressor section 112, a combustion section 114, and a turbine section 116. The second embodiment screw shaft turbine compressor 100 also includes a shaft 118. As best shown in FIG. 5, the three sections are generally cylindrically-shaped having generally circular cross-sections. Other variations and embodiments may have only two sections or may have non circular cross-sections as applicable. For example, a variation of the second embodiment may a single unitary section combining the combustion and turbine sections 114, 116. However, in such a variation, the combustion and turbine sections 114, 116 would perform generally the same function as described herein.

Typically, the three sections 112, 114, & 116 of the second embodiment screw shaft turbine compressor 100 are coupled together in some manner. For example, as illustrated in FIG. 5, a portion of the compressor section 112 can be comprised of one or more threads 120 which are adapted to mate or threadably engage with a threaded portion of the combustion section 114. The combustion section 114 and the turbine section 116 of the second embodiment screw shaft turbine compressor 100 are typically welded or near-permanently adhered together in some fashion. However, in some variations the combustion section 114 can be adapted to couple with the turbine section 116 through one or more threads adapted to mate with each other as described with respect to the first embodiment screw shaft turbine compressor 10. Upon coupling the turbine section 116 to the combustion section 114 and the compressor section 112 to the combustion section 114, a combustion chamber 150 is created (FIG. 4). One side of the combustion chamber 150 is typically comprised of the compressor section 112, one side of the combustion chamber 150 is typically comprised of the turbine section 116, and at least one combustion chamber wall is typically comprised of the combustion section 114.

Advantageously, the threaded engagement between the compressor section 112 and combustion section 114 is adapted to enable variations in a distance 151 that an end of the one or more grooves 131a extends into the combustion chamber 150. Moreover, the one or more grooves 131 can be a straight groove as best illustrated in FIG. 4. In implementations of the second embodiment screw shaft turbine compressor 100, the straight groove can be tapered and resembles a keyway along the shaft 118. However, it is pertinent to note that the one or more grooves 131a can also be a spiraled or helical groove as described above with respect to the first embodiment screw shaft turbine compressor 10. Moreover, the one or more grooves 131a are typically adapted to increases gas pressure of an air/fuel mixture as it enters the combustion chamber 151.

Variations in the distance 151 change the amount of air/fuel mixture that can pass into the combustion chamber 150. In one implementation, the distance 151 can be such that the resulting opening serving as an ingress point for the air/fuel mixture into the combustion chamber 150 is substantially smaller then the opening of the one or more grooves 131b serving as an egress point for the exhaust.

Moreover, the coupling between the compressor section 112 and combustion section 114 is typically by threaded engagement as illustrated in FIG. 5. However, other ways of coupling these two sections together are contemplated such as but not limited to slidable engagement. The movable engagement between the compressor section 112 and the combustion section 114 allows for more precise and adjustable regulation of the air/fuel mixture flowing into the combustion chamber 150. Additionally, the compressor section 112 and combustion section 114 can be welding together when the distance 151 is a specific distance adapted a particular air/fuel mixture entering the compressor chamber 150 is desired for an implementation of the second embodiment screw shaft turbine compressor 100. However, as discussed with respect to the first embodiment screw shaft turbine compressor 10, many variations and constructions of the three sections 112, 114, & 116 including but not limited to a unitary embodiment are contemplated.

In one version of the second embodiment screw shaft turbine compressor 100, the combustion section 114 can have an outside diameter of approximately 11 inches whereby the threaded collar portion extending radially beyond the compressor and turbine sections 112, 116 is approximately one inch in diameter. In one version, the combustion chamber 150 comprises a length of approximately 4 inches along the general longitudinal axis. However, it is to be appreciated that other versions and embodiments that have larger and smaller combustion sections and combustion chambers therein. Moreover, the combustion section is typically comprised of materials adapted to withstand the heat and pressure conditions present during operation of the second embodiment screw shaft turbine compressor 100. For example, one implementation of the combustion section 114 can be comprised of steel or a steel alloy. Other materials, such as, but not limited to, composite materials can be used as well in a various embodiments.

Included in the combustion section 114 is at least one ignition device 123. In an exemplary embodiment, the second embodiment screw shaft turbine compressor 100 includes two ignition devices disposed on generally opposite sides of the combustion chamber 150, as best shown in FIG. 4. The at least one ignition device 123 can be a device, such as, but not limited to, a spark plug, which is adapted to create an arc of electrical current between two electrodes. The arc of current creates a spark which ignites an air/fuel mixture in the combustion section 150.

Typically, the air/fuel mixture enters the combustion chamber 150 through a channel created by a bore 119 extending longitudinally though the compressor section 112 and the one or more groove 131a on the shaft 118. The bore 119 typically extends longitudinally from a compressor section proximal end 117 to a compressor section distal end 115. In one implementation, the longitudinal axis of the bore 119 is generally perpendicular to the compressor section proximal and distal ends. Additionally, the center of the bore is typically generally aligned with the center of the proximal and distal ends 117, 119 of the compressor section.

In some implementations, the bore 119 is surrounded by a bushing 113. The bushing 113 may not completely encircle the bore in every implementation of the second embodiment screw shaft turbine compressor 100, but in at least one version the bushing 113 substantially surrounds the bore 119. The bushing 113 can be comprised of ceramic or hardened steel, however, other suitable materials known in the art are contemplated. The bushing 113 is generally adapted to strengthen the structural integrity of the bore 119 in relation to its operation with the shaft 118. Moreover, the bushing 113 can (and typically does) extend into the turbine section 116. It is important that the shaft 118 be closely fit in some implementations with the bushing 113 in the turbine section 116 in order to contain and direct high pressure exhaust gasses emanating from the combustion section 114. Additionally, it is important that the bushing 113 sufficiently durable and hard as to withstand the extremely high temperatures associated with the exhaust gasses emanating from the combustion section 114 through the turbine section 116.

The compressor section 112 can be comprised of a steel alloy or any other suitable material for its intended purpose. The compressor section 112 can be comprised of two portions. A compressor first portion 111a may have a generally equal diameter as that of the compressor second portion 109. The compressor first portion 111a can be removably coupled to the compressor second portion 109 via one or more fasteners 161 such as, but not limited to, screws or bolts.

In at least one implementation of the second embodiment screw shaft turbine compressor 100, the length (longitudinally with respect to the axis of the bore) of compressor first portion 111a may be about 4¼ inches and the diameter of the compressor first portion 111a may be about 9 inches. The length (longitudinally with respect to the axis of the bore) of the compressor second portion 109 may also be about 4¼ inches and the diameter of compressor second portion 109 may also be about 9 inches.

One or more inlet ports 104 are included in the compressor section 112, typically in the compressor second portion 109. As illustrated in FIG. 4, only one inlet port 104 is disposed on the compressor second portion 109. However, other versions or implementations can include two or more inlet ports. At an end of the inlet port proximal the bore, an arcuate or dome-like cavity 104a typically surrounds the entire bore 119 and shaft 118 therein. The one or more inlet ports 104 are adapted to allow air, fuel, air/fuel mixture, or any other fluid or suitable substance to pass through the inlet port 104, then into the cavity 104a of the inlet port 104, and into the bore 119. The longitudinal axis of the inlet port 104 is typically perpendicularly aligned with the longitudinal axis of the compressor second portion 109 and the bore 119. Moreover, an aperture and connector end of the inlet port 104 typically extend radially from the axis of the bore 119. In some variations, the inlet port 104 may include a device such as, but not limited to, a nozzle, adapted to release fluid into the bore 119. The nozzle or a valve may also eliminate or reduce backflow of exhaust into the inlet port 104 than may occur during combustion. Moreover, the nozzle or vale to eliminate or reduce backflow of exhaust may be disposed closer to the combustion chamber 150 in some implementations. Additionally, to substantially reduce backflow of exhaust from combustion within the combustion chamber 105, the cross-sectional area or opening related to the air/fuel mixture input (coming from the compressor section 112) can be made significantly smaller than the cross-sectional area or opening related to the exhaust egress (provided by the turbine section 116). For example, in one implementation, the compressor section 112 and combustion section 114 can be adjusted so that effectively a pinhole provides the input into the combustion chamber 150.

A rotatably adapted support mechanism such as, but not limited to, a bearing 127 is typically included in the compressor first portion 111a. However, the support mechanism can be located in the compressor second portion 109 in some implementations as well. The bearing 127 is generally adapted to permit rotational motion between the shaft 118 and the compressor section 112. A version of the bearing 127 can include ball bearings. However, other versions bearings can also be used such, but not limited to, jewel bearings, fluid bearings, magnetic bearings, and flexure bearings. Fluid bearings may be gas bearings, hydrostatic bearings, hydrodynamic bearings, foil bearings, or journal bearings. It is to be appreciated that other radially adapted support mechanisms may be used alternatively or in conjunction with the bearing 127.

The shaft 118 is typically a cylindrical rod having a generally circular cross-section. The shaft 118 typically comprises a diameter adapted to fit into the bore 119 in the compressor and turbine sections 112, 116, as best illustrated in FIG. 4. In one version, the shaft 118 has a diameter of 2.1867 inches. The shaft 118 typically includes one or more groove 131. In a version of the shaft 118, the one or more grooves 131 can comprise a first groove 131a and a second groove 131b. With respect to the shaft 118, in an implementation of the one or more grooves 131 the first groove 131a is disposed proximal a shaft first end 132 and the second groove 131b is disposed distal the shaft first end 132.

The first groove 131a can comprise an elongated channel extending longitudinally with respect to the axis of the shaft 118. The elongated channel can be a generally quadrilateral polygon cutout from the surface of the shaft 118. The elongated channel generally extends from the one or more inlet ports 104 to the combustion chamber 150. The elongated channel can also be slightly tapered wherein the width at an end proximal the combustion chamber 150 is narrower than the end distal the combustion chamber 150. In some implementation, the elongated channel can resemble a keyway along the shaft 118. Additionally, the first groove 131a of the one or more grooves 131 can comprise a plurality of elongated channels extending from the one or more inlet ports 104 to the combustion chamber 150. It is also pertinent to note that the first groove 131a can also comprise a number of groove shapes such as, but not limited to, a spiraled or helical groove.

The second groove 131b of the one or more grooves 131 typically comprises a spiraled or helical groove. The second groove 131b generally extends from the combustion chamber 150 to the one or more exhaust ports 143. In various implementations of both the first and second embodiment screw shaft turbine compressors 10 & 100, an angle of the spiraled or helical groove with respect to the longitudinal axis of the shaft 118 can be varied to speed to torque ratios. Thus, a method of generating different speed to torque ratios on the shaft using embodiments of the screw shaft turbine compressor includes varying the angle to achieve the desired result. The angle is typically between approximately 30 and 70 degrees. In implementations where maximum power is desired, the angle can be very steep with the angle at approximately 60-70 degrees. The angle is best illustrated in FIG. 3 with respect to the first embodiment. Looking at the second groove 31 towards the shaft distal end 33, the angle is formed the relative center of the groove or channel (as would be best seen if the shaft 18 where dissected in a longitudinal cross-ssection) relative to the longitudinal axis of the shaft 18. In some implementations, the width of the second groove 31 in the turbine section can stay substantially stable throughout the turbine section. Moreover, the distance between adjacent turns of the second groove 31 in the turbine section may stay substantially stable as well. However, other implementations with varied widths and distances between adjacent turns are contemplated.

To compress the air/fuel mixture in the second embodiment screw shaft turbine compressor 100, the width of the straight groove 131a can be decreased as the distance from the shaft first end 132 of the shaft 118 increases. An ungrooved distance between the grooves 131a and 131b along the shaft 118 typically resides in the combustion chamber 150 as best illustrated in FIG. 4. It is pertinent to note that other groove designs adapted to compress the mixture are also contemplated. For example, the depth of the groove may vary along its length.

The shaft first end 132 may extend further than the compressor section proximal end 117, particularly when the shaft 118 is to be operatively coupled with another device or element. The shaft 118 typically is a single shaft which extends through the combustion chamber 150 and into the bore 119 located in the turbine section 116. The groove on the shaft may begin anew at the point proximal the shaft 118 entering the turbine section bore.

As illustrated in FIGS. 4 & 5, the turbine section 116 can be substantially similar to the compressor section 112. However, the proximal end of the turbine section 116 can be coupled to the combustion section 114, whereas the distal end of the compressor section 112 can be coupled to the combustion section 114. A difference between the compressor section and the turbine section is that a distal end surface 129 of the compressor section 112 is typically perpendicular from the longitudinal axis of the bore 119, whereas the proximal end surface 142 of the turbine section 116 is typically a generally concave surface with respect to the combustion chamber 150 formed by these surfaces. The turbine section 116 can also be comprised of two portions. A turbine first portion 111b may have a generally equal diameter as that of the turbine second portion adjacent thereto. The turbine first portion 111b can be removably coupled to the turbine second portion via one or more fasteners 161 such as, but not limited to, screws or bolts.

As similarly described with respect to the compressor section 112, a rotatably adapted support mechanism such as, but not limited to, a bearing 127 is typically included in the turbine first portion 111b of the turbine section 116. However, the support mechanism can be located in the turbine second portion in some implementations as well. The bearing 127 is generally adapted to permit rotational motion between the shaft 118 and the compressor section 112. The removable coupling of the bearings 127 in both the compressor section 112 and the turbine section 116 enable easier maintenance or repair of the bearings 127, as well as maintenance, repair, and/or replacement (pursuant to design choices, for instance) of the shaft 118.

In operation, an air/fuel mixture or fluid enters into the bore 119 of the compressor section 112 through one or more inlet ports 104. As the air/fuel mixture enters the bore 119, it is captured into the groove 131a on the shaft 118. As the shaft 118 spins and/or the air/fuel mixture is forced into the one or more inlet ports 104, the air/fuel mixture travels towards the combustion chamber 150. As previously discussed, the air/fuel mixture can be compressed in the process. Upon entering the combustion chamber 150, the air/fuel mixture can be ignited. The combustion energy caused by ignition can be directed on the shaft 118 entering the turbine section 116, thereby spinning the shaft 118 while the exhaust gas exits out the one or more exhaust ports 143. Ignition timing can vary depending on the specific implementation of the second embodiment screw shaft turbine compressor 100.

Figure 6:
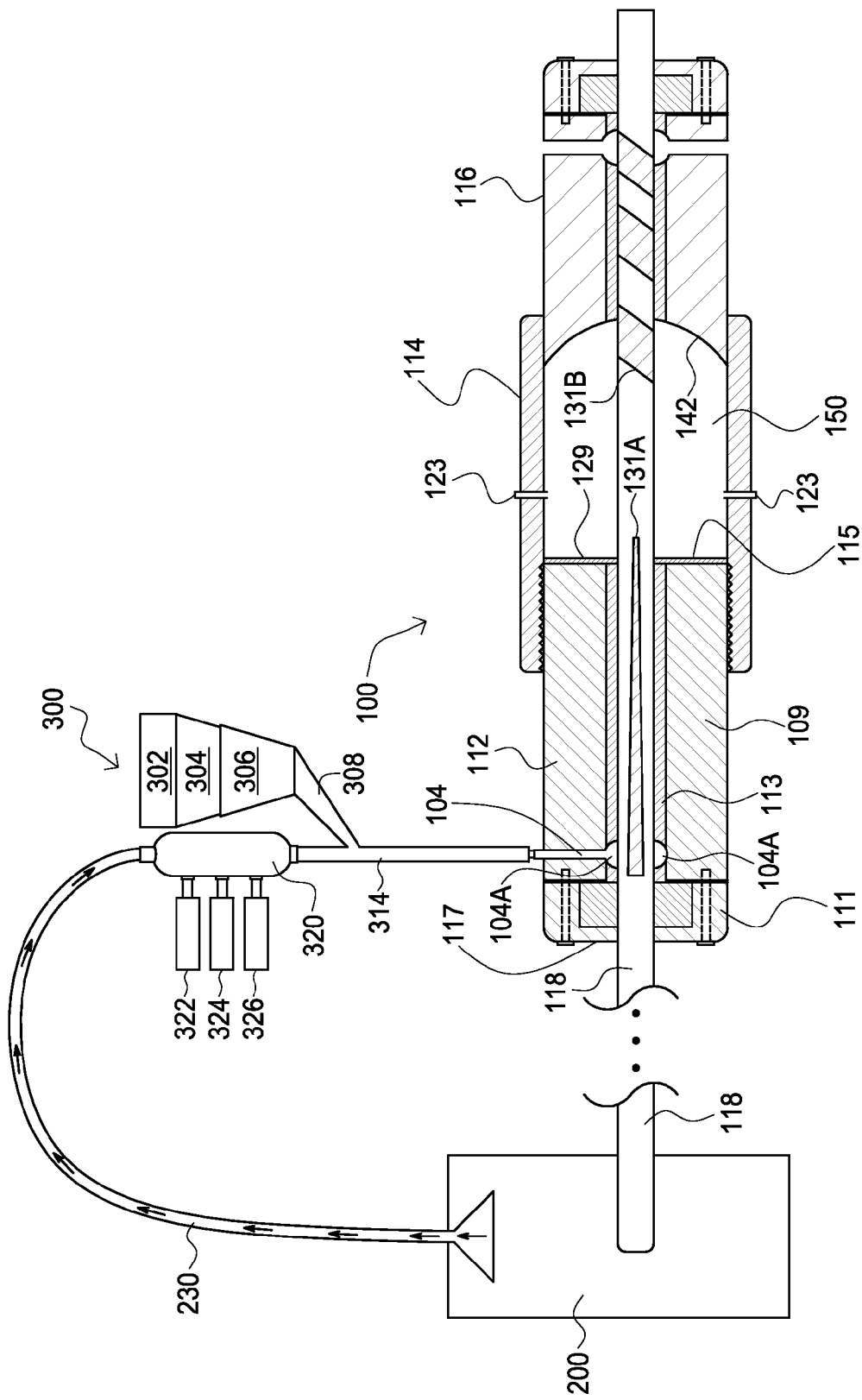
FIG. 6 is a side cut-away and plan view of a system for generating torque on a shaft according to an embodiment.

An Exemplary Embodiment of a System for Generating Torque on a Shaft:

Now referring to FIG. 6, an exemplary embodiment of a system for generating torque on a shaft is shown. A second embodiment screw shaft turbine compressor 100 may be used in the system. As previously described, the second embodiment screw shaft turbine compressor 100 comprises three main sections—a compressor section 112, a combustion section 114, and a turbine section 116. The system also comprises a shaft 118 (which may be considered part of the shaft turbine compressor or part of the system) that extends though the second screw shaft turbine compressor 100. The shaft 118 is rotatably coupled to the compressor section 112 and the turbine section 116. It is pertinent to note that all contemplated embodiments and variation of the screw shaft turbine compressor described above can be used in the system.

Generally, the compressor section 112 comprises a compressor section bore and one or more inlet ports 104. The one or more inlet ports 104 are adapted to provide an air/fuel mixture to the compressor section bore. The combustion section 114 is operatively coupled to the compressor section 112. The combustion section 114 comprises a combustion chamber 150 and at least one ignition device 123. The turbine section 116 is operatively coupled to the combustion section 114. The turbine section 116 comprises a turbine section bore and one or more exhaust ports 143. The one or more exhaust ports 143 are adapted to release exhaust from the turbine section bore. A circumferential channel may extend around the turbine section bore to the one or more exhaust ports 143 in a similar fashion as the circumferential channel or domed ring-like cavity 104a used in conjunction with the inlet ports 104.

The system can also comprise an air compressor 200 and a fuel delivery assembly 300. The air compressor 200 is operatively coupled to the shaft 118 typically proximal the compressor section proximal end 117. The shaft 118 generally extend from the air compressor 200 through the compressor section 112, the combustion section 114, and then through the turbine section 116 where the shaft 118 can operatively couple to a source or device adapted to receive torque (e.g., a generator or other industrial applications). The air compressor 200 is further operatively coupled to the fuel delivery assembly 300 whereby a conduit 230 supplies forced air into a manifold 320 of the fuel delivery assembly 300.

The fuel delivery assembly 300 comprises one or more fuel sources which combine in or proximal the manifold 320 to create the air/fuel mixture. For example, the one or more fuel sources can comprise a 322 for propane, a source 324 for various hydrocarbons, and a source 326 for alcohols. Moreover, the fuel delivery assembly 300 can comprise a bin 302 for wood and/or coal, a hopper 304, and a crusher 306. The crushed wood and/or coal can be injected via a control flow nozzle 308. The entire air/fuel mixture is then injected into the one or more inlet ports 104 via a conduit 314 into the compressor section 112.

Similar to embodiments of the screw shaft turbine compressor, embodiments of the system for generating torque on a shaft include one or more grooves of various shapes and sizes. For example, the one or more grooves 131 can include one or more helically-shaped grooves 131b disposed on the shaft 118 along at least a portion of the combustion section 114 and at least a portion of the turbine section 116. Additionally, the one or more grooves 131 can include one or more generally straight grooves 131a disposed on the shaft 118 along at least a portion of the compression section 112 and at least a portion of the combustion section 114. Hence, the variations and implementations of embodiments of the screw shaft turbine compressor can be applied to the system in order to customize it a given application.

Alternative Embodiments and Variations

The various embodiments and variations thereof, illustrated in the accompanying figures and/or described above, are merely exemplary and are not meant to limit the scope of the invention. It is to be appreciated that numerous other variations of the invention have been contemplated, as would be obvious to one of ordinary skill in the art, given the benefit of this disclosure.

All variations of the invention disclosed in this application are intended and contemplated to be within the spirit and scope of the invention.

I claim:

1. A device comprising:
   a compressor section, the compressor section comprising,
     a compressor section bore, and
     one or more inlet ports, the one or more inlet ports adapted to provide fuel to the compressor section bore;
   a combustion section, the combustion section operatively coupled to the compressor section and the combustion section comprising a combustion chamber and at least one ignition device;
   a turbine section, the turbine section operatively coupled to the combustion section and the turbine section comprising,
     a turbine section bore, and
     one or more exhaust ports, the one or more exhaust ports adapted to release exhaust from the turbine section bore; and
   a shaft, the shaft comprising one or more grooves disposed thereon and the shaft extending from at least a portion of the compressor section, through the combustion section, and to at least a portion of the turbine section;
   wherein (i) the shaft is rotatably coupled to the compressor section and the turbine section, (ii) the one or more grooves includes one or more helically-shaped grooves disposed on the shaft along at least a portion of the combustion section and at least a portion of the turbine section.

2. The device of claim 1 further comprising a bushing substantially surrounding the compressor section bore.

3. The device of claim 1 further comprising a bushing substantially surrounding the turbine section bore.

4. The device of claim 1, wherein the compressor section further includes a compressor first portion, a compressor second portion, the compressor first portion and the compressor second portion being removably coupled together, and a support mechanism disposed within a one of the compressor first portion and the compressor second portion.

5. The device of claim 4, wherein the support mechanism includes bearings.

6. The device of claim 1, wherein the turbine section further includes a turbine first portion, a turbine second portion, the turbine first portion and the turbine second portion being removably coupled together, and a support mechanism disposed within a one of the turbine first portion and the turbine second portion.

7. The device of claim 6, wherein the support mechanism includes bearings.

8. The device of claim 1, wherein the combustion section is movably coupled to the compressor section and fixably coupled to the turbine section.

9. The device of claim 8, wherein said moveably coupling of the compressor section and the combustion section is accomplished by threaded engagement.

10. The device of claim 1, wherein the one or more grooves further includes one or more generally straight grooves disposed on the shaft along at least a portion of the compression section and at least a portion of the combustion section.

11. The device of claim 10, wherein the one or more generally straight grooves are tapered having a narrower groove proximal the combustion section and a wider groove distal the combustion section.

12. The device of claim 1, wherein the one or more inlet ports include a circumferential channel around the compressor section bore.

13. The device of claim 1, wherein the one or more exhaust ports include a circumferential channel around the turbine section bore.

14. The device of claim 1, wherein the one or more exhaust ports in the turbine section comprises eight exhaust ports generally radially disposed on the turbine section.

15. The device of claim 1, wherein a wall of the combustion chamber adjacent to the turbine section is generally concave.

16. A method of generating different speed to torque ratios on the shaft using the device of claim 1, the method comprising:
   varying an angle of the one or more helically-shaped grooves relative to the longitudinal axis of the shaft.

17. The method of claim 16, wherein the angle is between approximately 35 and 60 degrees.

18. A system for generating torque on a shaft, the system comprising:
   (i) a shaft, the shaft comprising one or more grooves disposed thereon;
   (ii) a screw shaft turbine compressor operatively coupled to the shaft, the screw shaft turbine compressor comprising,
     a compressor section, the compressor section comprising,
       a compressor section bore, and
       one or more inlet ports, the one or more inlet ports adapted to provide an air/fuel mixture to the compressor section bore;
     a combustion section, the combustion section operatively coupled to the compressor section and the combustion section comprising a combustion chamber and at least one ignition device; and
     a turbine section, the turbine section operatively coupled to the combustion section and the turbine section comprising,
       a turbine section bore, and
       one or more exhaust ports, the one or more exhaust ports adapted to release exhaust from the turbine section bore;
   (iii) an air compressor operatively coupled to the shaft; and
   (iv) a fuel delivery assembly comprising one or more fuel sources to create the air/fuel mixture, the fuel delivery assembly operatively coupled to the air compressor and the one or more inlet ports of the of the screw shaft turbine compressor;
   wherein the shaft is rotatably coupled to the compressor section and the turbine section and extends from the air compressor, through the compressor section, through the combustion section, and through the turbine section.

19. The system of claim 18, wherein the one or more grooves include one or more helically-shaped grooves disposed on the shaft along at least a portion of the combustion section and at least a portion of the turbine section of the screw shaft turbine compressor.

20. The system of claim 18, wherein the one or more grooves include one or more generally straight grooves disposed on the shaft along at least a portion of the compression section and at least a portion of the combustion section of the screw shaft turbine compressor.

* * * * *